United States Patent
Chen et al.

(10) Patent No.: US 10,570,325 B2
(45) Date of Patent: Feb. 25, 2020

(54) BRANCHED ACID EMULSIFIER COMPOSITIONS AND METHODS OF USE

(71) Applicant: M-I L.L.C., Houston, TX (US)

(72) Inventors: Yiyan Chen, Sugar Land, TX (US); Dimitri M. Khramov, Katy, TX (US)

(73) Assignee: M-I L.L.C., Houston, TX (US)

( * ) Notice: Subject to any disclaimer, the term of this patent is extended or adjusted under 35 U.S.C. 154(b) by 64 days.

(21) Appl. No.: 15/394,056

(22) Filed: Dec. 29, 2016

(65) Prior Publication Data

US 2017/0190945 A1    Jul. 6, 2017

Related U.S. Application Data

(60) Provisional application No. 62/273,109, filed on Dec. 30, 2015.

(51) Int. Cl.
*C09K 8/36*    (2006.01)

(52) U.S. Cl.
CPC ...................... *C09K 8/36* (2013.01)

(58) Field of Classification Search
CPC .................... C09K 8/32; C09K 8/36
See application file for complete search history.

(56) References Cited

U.S. PATENT DOCUMENTS

| | | |
|---|---|---|
| 2004/0214725 A1 | 10/2004 | Moss |
| 2004/0259738 A1 | 12/2004 | Patel |
| 2007/0293401 A1 | 12/2007 | Ballard |
| 2013/0331302 A1 | 12/2013 | Patel et al. |
| 2015/0051120 A1* | 2/2015 | Hurd ................. C09K 8/36 507/131 |

FOREIGN PATENT DOCUMENTS

EP    0400865 A1    12/1990

OTHER PUBLICATIONS

International Search Report and Written Opinion issued in International Application No. PCT/US2016/069547 dated Apr. 17, 2017 (12 pages).
American Petroleum Institute at API Recommended Practice 13B-2, Third Edition (Feb. 1998).
International Preliminary Report on Patentability for the equivalent International patent application PCT/US2016/069547 dated Jul. 12, 2018.

* cited by examiner

*Primary Examiner* — Frances Tischler
(74) *Attorney, Agent, or Firm* — Jeffrey D. Frantz

(57) ABSTRACT

Compositions may contain an oleaginous base fluid, and a branched amidoamine surfactant prepared from the reaction of an alkylene amine or an oligoalkylene amine and a branched acid having a C4 to C24 primary hydrocarbon chain, and having one or more C1 to C24 branches. Methods may include emplacing a wellbore fluid into a wellbore, wherein the wellbore fluid contains an oleaginous base fluid; and a branched amidoamine surfactant prepared from the reaction of an alkylene amine or an oligoalkylene amine and a branched acid having a C4 to C24 primary hydrocarbon chain, and having one or more C1 to C24 branches.

11 Claims, No Drawings

BRANCHED ACID EMULSIFIER COMPOSITIONS AND METHODS OF USE

CROSS-REFERENCE TO RELATED APPLICATIONS

This application claims priority to U.S. Patent Application No. 62/273,109 filed on Dec. 30, 2015, which is incorporated herein by reference.

BACKGROUND

During the drilling of a wellbore, various fluids are typically used in the well for a variety of functions. The fluids may be circulated through a drill pipe and drill bit into the wellbore and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and lubricate the drill string and bit, and/or to maximize penetration rate.

SUMMARY

In one or more aspects, embodiments disclosed herein relate to compositions may contain an oleaginous base fluid, and a branched amidoamine surfactant prepared from the reaction of an alkylene amine or an oligoalkylene amine and a branched acid having a C4 to C24 primary hydrocarbon chain, and having one or more C1 to C24 branches.

In another aspect, embodiments disclosed herein relate to methods that include emplacing a wellbore fluid into a wellbore, wherein the wellbore fluid contains an oleaginous base fluid; and a branched amidoamine surfactant prepared from the reaction of an alkylene amine or an oligoalkylene amine and a branched acid having a C4 to C24 primary hydrocarbon chain, and having one or more C1 to C24 branches.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Embodiments disclosed herein are directed to compositions for stabilizing wellbore fluid formulations, including invert emulsion drilling and treatment fluids. In another aspect, the present disclosure is directed to amidoamine surfactants prepared from branched acids. Branched amidoamine surfactants in accordance with the present disclosure function by stabilizing the interface between oleaginous and aqueous fluids, maintaining the phase boundary between the two phases and reducing coalescence, settling, and/or creaming.

Branched amidoamine surfactants in accordance with the present disclosure may be used to prepare emulsified wellbore fluids, including water-in-oil or invert emulsions in which an aqueous internal phase is stabilized by a surfactant in an oil continuous phase. Surfactants, such as amidoamine surfactants, are relatively small molecules that often have a hydrophobic portion of the molecule that interacts with oleaginous fluids and a hydrophilic, often polar, portion of the molecule that interacts with aqueous fluids. When combined with a mixture of aqueous and oleaginous fluids, the surfactant orients at the interface between the phases and forms a micelle. Depending on the balance between the hydrophobic and hydrophilic portions of the molecules, surfactants may form stronger barriers between the phases and more stable emulsions.

In one or more embodiments, branched surfactants may improve the stability of aqueous fluids in invert emulsions by modifying the interphase packing or the packing efficiency. For example, with surfactants containing linear hydrocarbons in the hydrophobic portion of the molecule, the micelle formed by the surfactant may contain a relatively low surface density of hydrocarbon chains, creating a weak barrier at the micelle boundary that is more susceptible to rupture and coalescence of the internal phase during storage or at high-pressure, high-temperature (HPHT) conditions. In contrast, the branched tails of the present disclosure may increase the tail's cross-sectional area and thereby provide a more effective packing to protect the micelle interface.

Branched amidoamine surfactants in accordance with the present disclosure may exhibit increased emulsion stability, reduced sag, lower equivalent circulating density and gel strength than comparative linear amidoamines. Branched amidoamine surfactants may also possess low pour points and increased flowability, which translates to easier transport and lower mixing energy requirements during wellbore fluid preparation. Amidoamine surfactants in accordance with the present disclosure may also improve the stability of oil-based drilling fluids and invert emulsions, including at HPHT conditions in which standard surfactants degrade. Moreover, tuning the branched acid used to prepare the amidoamine surfactants may allow for a systematic approach to surfactant design, including tuning emulsion properties to suit a specific mud formulation.

Many of the issues with emulsion instability at HPHT conditions and can be attributed to several specific issues including insufficient emulsifier hydrolytic stability, incompatibility of the final emulsified wellbore fluid with pour point depressants that are often added to aid pourability of the emulsifier, and weak emulsion droplet membranes that degrade over time. Amidoamines prepared from branched acids in accordance with the present disclosure may exhibit enhanced hydrolytic stability, which may be attributed to the increased branching providing some degree of steric hindrance that lowers the hydrolysis rate of the amide bond between the amidoamine and the branched acid. Moreover, branching may also allow the branched chains to entangle to some degree, which may anchor the emulsifier at the micelle interface.

In addition to surfactant stability, other factors that may be considered are the ease of use of surfactant to prepare wellbore fluid compositions. For example, amidoamine surfactants produced with linear unsaturated fatty acids may also exhibit relatively high pour points, and when temperatures fall below the pour point the surfactant becomes a solid or semi-solid that must be heated in order to transfer the material from a storage container. While introducing unsaturation into the hydrophobic portion of the surfactant may reduce the pour point of the surfactant, unsaturation also increases the occurrence of oxidation at these sites, particularly under HPHT conditions. To this end, branched amidoamine surfactants may improve emulsion droplet stability and contribute to lowering of the pour point and reduce the need of pour point depressants during wellbore fluid preparation that may negatively affect emulsion stability or other fluid properties.

In some embodiments, branched amidoamine surfactants may also be used to prepare stable emulsions from oleaginous base fluids such as internal olefins that are becoming more widespread as a "green" alternative to diesel oils. Common emulsifiers often underperform when used with internal olefin base fluids due to the changes in solvency when compared with standard base oils (e.g., diesel). Emulsion stability may be further hindered by extreme temperature and pressure conditions that can degrade surfactants and other wellbore fluid components. Amidoamine surfactants may also exhibit favorable environmental and toxicity profiles when compared to other surfactant classes.

Whether an emulsion of oil and water turns into a "water-in-oil" emulsion or an "oil-in-water" emulsion depends on a number of factors such as the volume fraction of both phases, the type(s) of surfactant present, temperature, and pH. For most emulsions, the Bancroft rule applies, which holds that surfactants tend to produce an internal phase from chemicals and solvents in which they are poorly soluble. The degree of emulsion for a mixed fluid may be tuned from complete emulsion to a metastable emulsion through the selection of the components of the wellbore fluid, particularly by selecting fluid components on the basis of hydrophilic/lipophilic balance (HLB).

HLB refers to the ratio of the hydrophilicity of a surfactant, due to the presence of polar groups, to the hydrophobicity of the surfactant due to lipophilic groups. HLB values may be calculated by considering the molecular weight contributions of the respective hydrophilic and lipophilic portions and taking the ratio thereof (divided by 5). A HLB value of 0 corresponds to a completely hydrophobic molecule, and a value of 20 corresponds to a completely hydrophilic molecule. Broadly, the HLB value may be used to estimate the emulsifying properties of a surfactant. For example, surfactants in the range of 0 to 5 are water-insoluble and form water-in-oil emulsions, surfactants in the range of 6 to 9 are partially soluble and are often referred to as wetting agents, surfactants in the range of 10 to 12 form translucent to clear solutions in aqueous fluids and referred to as detergents, and surfactants in the range of 13 to 20 are very water soluble and form oil-in-water emulsions. Branched amidoamine surfactants in accordance with the present disclosure may have an HLB value within the range of 0 to 10 in some embodiments, from 3 to 9 in other embodiments, and from 0 to 5 in still other embodiments.

Branched Amidoamine Surfactants

In one or more embodiments, wellbore fluids in accordance with the present disclosure may contain one or more branched amidoamine surfactants prepared from the reaction with an alkylene amine and a branched acid. For example, such branched amidoamine surfactants may be represented by the chemical formulas (I) to (IV):

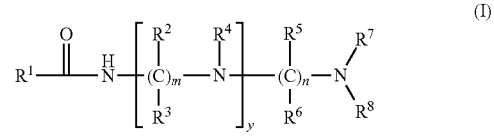

(I)

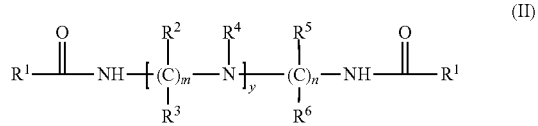

(II)

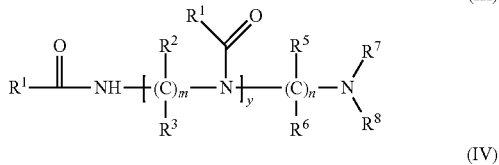

(III)

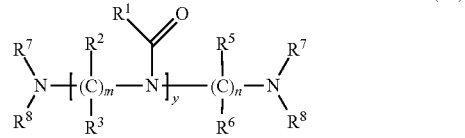

(IV)

where $R_1$ is a branched alkyl corresponding to the branched hydrocarbon chain contained in branched acid used to produce the amidoamine surfactant; $R^2$, $R^3$, $R^5$, and $R^6$ are each independently selected from H or a C1 to C4 alkyl; $R^4$, $R^7$, and $R^8$ are each independently selected from H, C1 to C4 alkyl for each carbon, C1 to C4 alkoxyalkyl, C1 to C4 hydroxyalkyl, or a hydrophilic capping agent; n and m are integers from 1 to 10; and y is an integer from 0 to 5. In some embodiments, alkylene amines may include oligoalkylene amines prepared from 1 to 5 repeating units of a C1 to C10 alkylene amine. The above formulae may be formed by reacting a branched acid with an alkylene amine, and depending on the hydrophilicity of the resulting product, with further optional reaction with a hydrophilic capping agent, such as a polycarboxylic acid or anhydride.

Branched acids suitable for preparing branched amidoamine surfactants may include alkyl carboxylic acids having a C4 to C24 primary hydrocarbon chain, and having one or more C1 to C24 branches. In other embodiments, branched acids may include various functionalities in the hydrocarbon chains including alkyl, alkenyl, alkynyl, cyclical, and aromatics.

In some embodiments, branched acids used to produce amidoamine surfactants in accordance with the present disclosure may contain branched alkyl groups that are symmetrical (having the same carbon chain length) or nearly symmetrical (the alkyl chains varying in length by one to three carbons) with respect to the branch point carbon. In some embodiments, amidoamine surfactants may be prepared from carboxylic acids having branching from the alpha carbon adjacent to the carbonyl carbon. For example, amidoarnine surfactants of the formulae shown above may have an $R^1$ of the general formula: $-(CH_2)_xC(R^9)(R^{10})(R^{11})$, where $R^9$ is hydrogen or a C1 to C24 alkyl, $R^{10}$ and $R^{11}$ are C1 to C24 alkyl chains extending from the branching carbon, where the alkyl chains may be the same carbon length or different, and x is an integer between 0 and 6. In some embodiments, amidoamine surfactants may contain an $R^1$ having a primary alkyl chain containing one or more alkyl branches from any point along the primary carbon chain that may range from C1-C24 in length. In yet other embodiments, amidoamine surfactants may contain an $R^1$ having repetitive alkyl branching that forms dendrimeric structures.

Amidoamine surfactants in accordance with the present disclosure may be prepared by reacting an alkylene amine or oligoalkylene amine with a branched acid. Branched acids in accordance with the present disclosure may include, for example, 2-butyloctanoic acid, multiply branched acids such as 2,2-dimethyloctanoic acid, 2,2-ethylmethlyheptanoic acid, 2,2-methyl-sec-butylbutanoic acid, 2,2-methylethylhexanoic acid, 3-ethyl-6-propyl-undecanoic acid, 3,7,11,15- tetramethylhexadecanoic acid, 2,6,10,14-tetramethylpentadecanoic acid, 4,8,12-trimethylhexadecanoic acid, and the like. In some embodiments, branched acids may include neoacids such as isooctanoic acid, isononanoic acid, neodecanoic acid, and the like. In one or more embodiments, amidoamine surfactants may be prepared from synthetic branched acids such as ISOCARB™, or branched acids derived from ISOFOL™, MARLIPAL™, ISALCHEM™, LIAL™, and ALCHEM™, all of which are commercially available from Sasol Chemicals LLC.

As mentioned above and referenced in the above formula, the branched acid emulsifier may be formed with reaction with a hydrophilic capping agent. Thus, the hydrophilic capping agent referenced in the above formula may include a group formed from reaction of the amine with a polycarboxylic acid, anhydride (of a carboxylic acid such as acetic acid or a polycarboxylic acid, including of those described below such as but not limited to maleic anhydride and succinic anhydride), urea, isocyanates (such as methylisocyanate), alpha-halocarboxylic acid (such as chloroacetic acid, chloropropionic acid, etc.), oxirane, cyclic diesters (such as lactide or glycolide), or cyclic sulfonate ester (such as propanesultone or other sultones). Polycarboxylic acids may include, for example, lactic acid, glycolic acid and ether derivatives thereof, succinic acid, malonic acid, (ethylenedioxy) diacetic acid, maleic acid, oxalic acid, adipic acid, diglycollic acid, tartaric acid, tartronic acid, fumaric acid, citric acid, aconitic acid, citraconic acid, carboxymethyloxysuccinic acid, lactoxysuccinic acid, 2-oxy-1,1,3-propane tricarboxylic acid, oxydisuccinic acid, 1,1,2,2-ethane tetracarboxylic acid, 1,1,3,3-propane tetracarboxylic acid, 1,1,2,3-propane tetracarboxylic acid, cyclopentane-cis, cis, cis-tetracarboxylic acid, cyclopentadienide pentacarboxylic acid, 2,3,4,5-tetrahydrofuran-cis, cis, cis-tetracarboxylic acid, 2,5-tetrahydrofuran-cis-dicarboxylic acid, 1,2,3,4,5,6-hexane-hexacarboxylic acid, mellitic acid, pyromellitic acid, phthalic acid, isophthalic acid, and terphthalic acid. In particular embodiments, the branched acid emulsifier of the present disclosure may be represented by formula (V) to (XI):

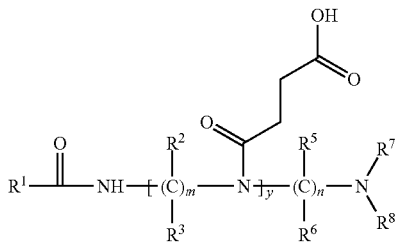

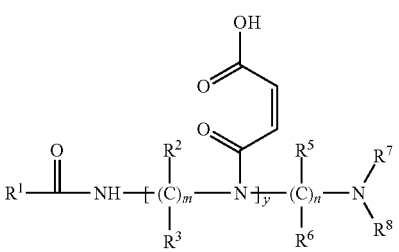

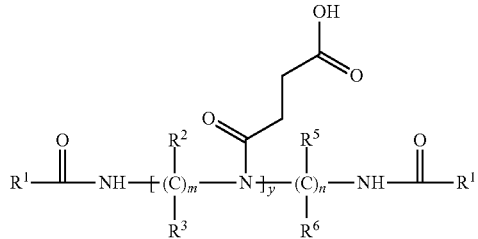

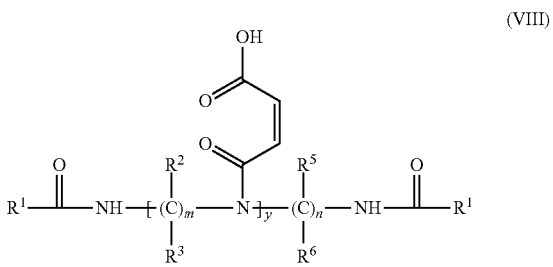

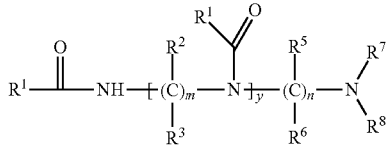

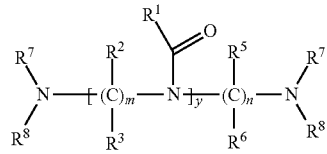

where $R_1$ is a branched alkyl corresponding to the branched hydrocarbon chain contained in branched acid used to produce the amidoamine surfactant; $R^2$, $R^3$, $R^5$, and $R^6$ are each independently selected from H or a C1 to C4 alkyl; $R^7$ and $R^8$ are each independently selected from H, C1 to C4 alkyl for each carbon, C1 to C4 alkoxyalkyl, and C1 to C4 hydroxyalkyl; n and m are an integers from 1 to 10; and y is an integer from 0 to 5. One of ordinary skill in the art would appreciate that chemical formulas (V) and (VI) may be arrived at by reacting chemical formula (I) described above having $R^4$ be hydrogen with succinic acid (or anhydride) or maleic acid (or anhydride). Further, chemical formulas (VII) and (VIII) may be arrived at by reacting chemical formula (II) described above having $R^4$ be hydrogen with succinic acid (or anhydride) or maleic acid (or anhydride). It is also envisioned that in one or more other embodiments, $R^4$, $R^7$ and $R^8$ in formulas (I) may each be a hydrogen and reacted with succinic acid (or anhydride) or maleic acid (or anhydride). Thus, the resulting surfactant would be chemical formula (V) or (VI) where $R_1$ is a branched alkyl corresponding to the branched hydrocarbon chain contained in branched acid used to produce the amidoamine surfactant; $R^2$, $R^3$, $R^5$, and $R^6$ are each independently selected from H or a C1 to C4 alkyl; $R^7$ and $R^8$ are selected from

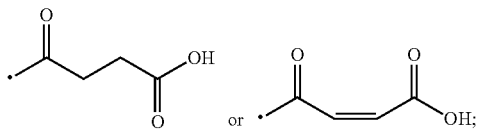

n and m are an integers from 1 to 10; and y is an integer from 0 to 5. In these embodiments (formulae (V) to (X)) containing $R^7$ and $R^8$, it is understood that $R^7$ and $R^8$ do not need to be formed from reaction with maleic acid (or anhydride) or succinic acid (or anhydride) but at least one of $R^7$ and $R^8$ are formed reaction with maleic acid (or anhydride) or succinic acid (or anhydride) if no other amines in the surfactant have been so reacted.

Base Fluids

Wellbore fluids in accordance with the present disclosure may be formulated as a water-in-oil or oil-in-water emulsion and, in some cases, a high internal phase ratio (HIPR) emulsion in which the volume fraction of the internal phase is a high as 90 to 95 percent. In some embodiments, wellbore fluids may contain an external oleaginous solvent component and an internal aqueous component having a ratio of the internal aqueous component to the external oleaginous component with the range of 30:70 to 95:5 in some embodiments, from 50:50 to 95:5 in some embodiments, and from 70:30 to 95:5 in yet other embodiments.

Suitable oleaginous fluids that may be used to formulate emulsions may include a natural or synthetic oil and in some embodiments, in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

Aqueous fluids useful for preparing wellbore fluid formulations in accordance with the present disclosure may include at least one of fresh water, sea water, brine, mixtures of water and water-soluble organic compounds, and mixtures thereof. In various embodiments, the aqueous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the wellbore fluids disclosed herein may be natural or synthetic, with synthetic brines tending to be much simpler in constitution. In one embodiment, the density of the wellbore fluid may be controlled by increasing the salt concentration in the brine (up to saturation, for example). In a particular embodiment, a brine may include halide or carboxylate salts of mono- or divalent cations of metals, such as cesium, potassium, calcium, zinc, and/or sodium.

In one or more embodiments, branched amidoamine surfactants may produce invert emulsions having increased stability to temperature and pressure aging, particularly when assayed using electrical stability (ES), for example. The ES test, specified by the American Petroleum Institute at API Recommended Practice 13B-2, Third Edition (February 1998), is often used to determine the stability of the emulsion. ES is determined by applying a voltage-ramped, sinusoidal electrical signal across a probe (consisting of a pair of parallel flat-plate electrodes) immersed in the mud. The resulting current remains low until a threshold voltage is reached, whereupon the current rises very rapidly. This threshold voltage is referred to as the ES ("the API ES") of the mud and is defined as the voltage in peak volts-measured when the current reaches 61 µA. The test is performed by inserting the ES probe into a cup of 120° F. (48.9° C.) mud applying an increasing voltage (from 0 to 2000 volts) across an electrode gap in the probe. The higher the ES voltage measured for the fluid, the stronger or harder to break would be the emulsion created with the fluid, and the more stable the emulsion is. Thus, the present disclosure relates to invert emulsion fluids having an electrical stability of at least 50 V in an embodiment, and in the range of 50 V to 1000 V in some embodiments, and from 75 V to 900 V in other embodiments.

When formulated as an invert emulsion, wellbore fluids may contain additional chemicals depending upon the end use of the fluid so long as they do not interfere with the functionality of the fluids (particularly the emulsion when using invert emulsion fluids) described herein. For example, weighting agents, wetting agents, organophilic clays, viscosifiers, fluid loss control agents, surfactants, dispersants, interfacial tension reducers, pH buffers, mutual solvents, thinners, thinning agents and cleaning agents may be added to the fluid compositions of this invention for additional functional properties.

In particular, the wellbore fluids of the present disclosure may be injected into a work string, flow to bottom of the wellbore, and then out of the work string and into the annulus between the work string and the casing or wellbore. This batch of treatment is typically referred to as a "pill." The pill may be pushed by injection of other wellbore fluids such as completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. Injection of such pills is often through coiled tubing or by a process known as "bullheading."

Upon introducing a wellbore fluid of the present disclosure into a borehole, a filtercake may be formed which provides an effective sealing layer on the walls of the borehole preventing undesired invasion of fluid into the formation through which the borehole is drilled. Filter cakes formed from wellbore fluids disclosed herein include multiple latex polymers and may have unexpected properties. Such properties may include increased pressure blockage, reliability of blockage, and increased range of formation pore size that can be blocked. These filtercakes may provide filtration control across temperature ranges up to greater than 400° F.

Where the formation is a low permeability formation such as shales or clays, the filtercakes formed using the wellbore fluids and methods of the present disclosure prevent wellbore fluid and filtrate loss by effectively blocking at least some of the pores of the low permeation formation. This may allow for support of the formation by maintaining sufficient pressure differential between the wellbore fluid column and the pores of the wellbore. Further, the filter cakes formed by wellbore fluids of the present disclosure may effectively seal earthen formations, and may be stable at elevated temperatures.

Although a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method comprising:
providing an invert emulsion wellbore fluid comprising an oleaginous base fluid, an aqueous fluid and a branched amidoamine surfactant comprising a branching carbon and having at least one C1 to C24 alkyl or alkenyl branch, the branched amidoamine surfactant prepared from a reaction of an alkylene amine or an oligoalkylene amine and a branched acid having a C4 to C24 primary alkyl or alkenyl chain, wherein the oleaginous base fluid forms an oleaginous external phase of the invert emulsion wellbore fluid and the aqueous fluid forms an aqueous internal phase of the invert emulsion wellbore fluid and the branched amidoamine surfactant stabilizes an interface between the oleaginous base fluid and the aqueous fluid; and
emplacing the invert emulsion wellbore fluid into a wellbore.

2. The method of claim 1, wherein the branched amidoamine surfactant is represented by the chemical formulae (I) (II), (III), or (IV):

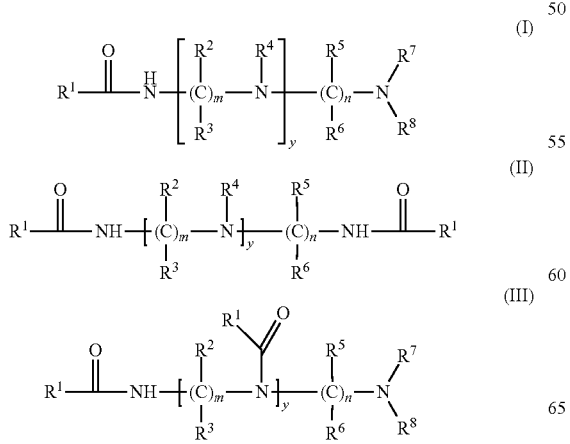

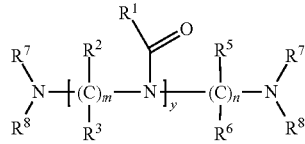

wherein $R^1$ is a branched alkyl corresponding to the branched alkyl or alkenyl chain contained in branched acid used to produce the amidoamine surfactant; $R^2$, $R^3$, $R^5$, and $R^6$ are each independently selected from H or a C1 to C4 alkyl; $R^4$, $R^7$, and $R^8$ are each independently selected from H, C1 to C4 alkyl for each carbon, C1 to C4 alkoxyalkyl, C1 to C4 hydroxyalkyl, and a hydrophilic capping agent; n and m are integers from 1 to 10; and y is an integer from 0 to 5, and
further wherein, when the branched amidoamine surfactant is represented by chemical formulae (IV), y is an integer from 1 to 5.

3. The method of claim 2, wherein $R^1$ of the branched amidoamine surfactant is of the formula: $-(CH_2)_xC(R^9)(R^{10})(R^{11})$, where $R^9$ is hydrogen or a C1 to C24 alkyl, $R^{10}$ and $R^{11}$ are C1 to C24 alkyl chains extending from the branching carbon, where the alkyl chains may be the same carbon length or different, and x is an integer between 0 and 6.

4. The method of claim 3, wherein $R^{10}$ and $R^{11}$ contain the same number of carbons.

5. The method of claim 1, wherein the branched amidoamine surfactant is prepared from a branched acid selected from a group consisting of 2-butyloctanoic acid, 2,2-dimethyloctanoic acid, 2,2-ethylmethylheptanoic acid, 2,2-methyl-sec-butylbutanoic acid, 2,2-methylethylhexanoic acid, 3-ethyl-6-propyl-undecanoic acid, 3,7,11,15-tetramethylhexadecanoic acid, 2,6,10,14-tetramethylpentadecanoic acid, and 4,8,12-trimethyldecanoic acid.

6. The method of claim 2, wherein the hydrophilic capping agent results from reaction with one of a polycarboxylic acid, anhydride, urea, isocyanate, alpha-halocarboxylic acid, oxirane, cyclic diester, or cyclic sulfonate ester.

7. The method of claim 1, wherein the branched amidoamine surfactant is selected from chemical formulae (V) to (X):

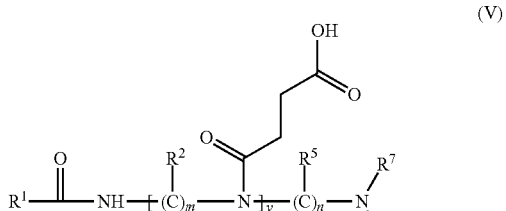

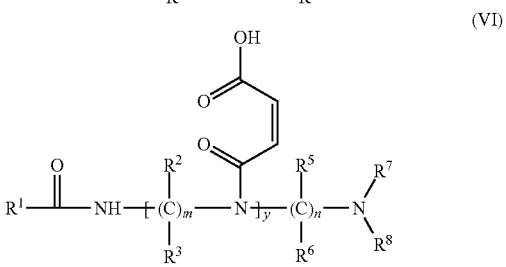

-continued

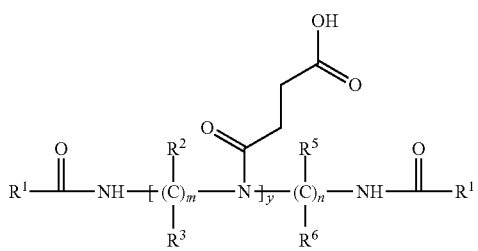
(VII)

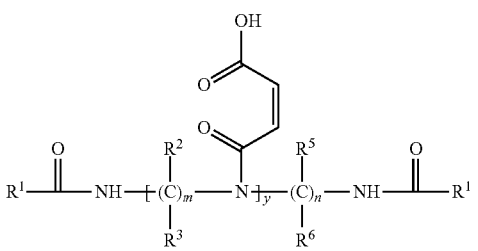
(VIII)

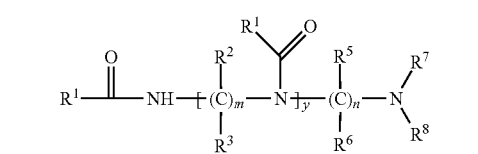
(IX)

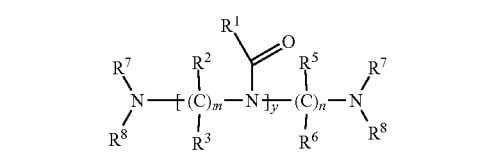
(X)

wherein $R^1$ is a branched alkyl corresponding to the branched alkyl or alkenyl chain contained in branched acid used to produce the amidoamine surfactant; $R^2$, $R^3$, $R^5$, and $R^6$ are each independently selected from H or a C1 to C4 alkyl; $R^7$ and $R^8$ are each independently selected from H, C1 to C4 alkyl for each carbon, C1 to C4 alkoxyalkyl, C1 to C4 hydroxyalkyl and

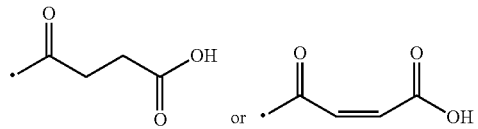

so long as the branched amidoamine surfactant has at least one group selected from

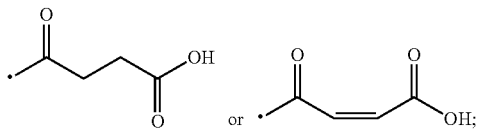

n and m are an integer from 1 to 10; and y is an integer from 0 to 5, and further wherein, when the branched amidoamine surfactant is selected from chemical formulae (IX) or (X), y is an integer from 1 to 5.

8. The method of claim 1, wherein the branched amidoamine surfactant has a hydrophilic/lipophilic (HLB) in the range of 3 to 9.

9. The method of claim 1, wherein the branched amidoamine surfactant has an HLB in the range of 0 to 5.

10. A method comprising:

providing an invert emulsion wellbore fluid comprising an oleaginous base fluid, an aqueous fluid and a branched amidoamine surfactant comprising a branching carbon and having at least one C1 to C24 branch, the branched amidoamine surfactant prepared from a reaction of an alkylene amine or an oligoalkylene amine and a branched acid having a C4 to C24 primary hydrocarbon chain, wherein the oleaginous base fluid forms an oleaginous external phase of the invert emulsion wellbore fluid and the aqueous fluid forms an aqueous internal phase of the invert emulsion wellbore fluid and the branched amidoamine surfactant stabilizes an interface between the oleaginous base fluid and the aqueous fluid; and emplacing the invert emulsion wellbore fluid into a wellbore, wherein the branched amidoamine surfactant is represented by the chemical formulae (I) (III), or (IV):

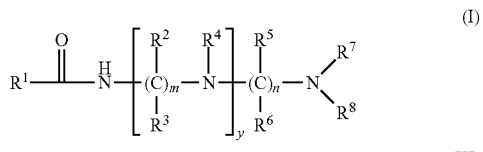
(I)

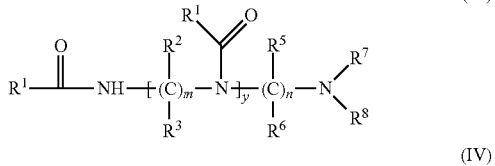
(III)

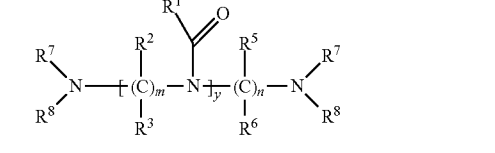
(IV)

wherein $R^1$ is a branched alkyl corresponding to the branched alkyl or alkenyl chain contained in branched acid used to produce the amidoamine surfactant; $R^2$, $R^3$, $R^5$, and $R^6$ are each independently selected from H or a C1 to C4 alkyl; $R^4$, $R^7$, and $R^8$ are each independently selected from H, C1 to C4 alkyl for each carbon, C1 to C4 alkoxyalkyl, C1 to C4 hydroxyalkyl, and a hydrophilic capping agent; n and m are integers from 1 to 10; and y is an integer from 0 to 5, and further wherein, when the branched amidoamine surfactant is represented by chemical formulae (III) or (IV), y is an integer from 1 to 5.

11. A method comprising:

providing an invert emulsion wellbore fluid comprising an oleaginous base fluid, an aqueous fluid and a branched amidoamine surfactant comprising a branching carbon and having at least one C1 to C24 branch, the branched amidoamine surfactant prepared from a reaction of an alkylene amine or an oligoalkylene amine and a branched acid having a C4 to C24 primary hydrocarbon chain, wherein the oleaginous base fluid forms an oleaginous external phase of the invert emulsion wellbore fluid and the aqueous fluid forms an aqueous internal phase of the invert emulsion wellbore fluid and the branched amidoamine surfactant stabilizes an interface between the oleaginous base fluid and the aqueous fluid; and emplacing the invert emulsion wellbore fluid into a wellbore, wherein the branched amidoamine surfactant is selected from chemical formulae (V), (VI), (VIII), (IX) or (X):

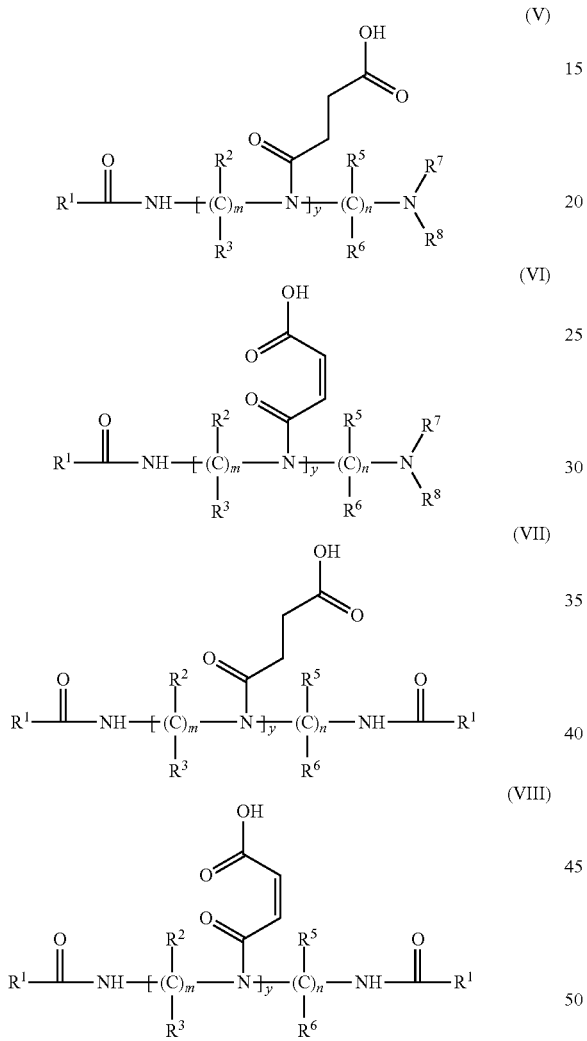

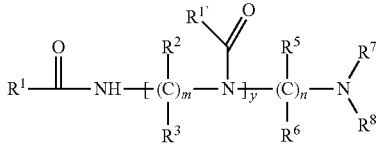

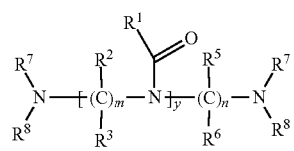

wherein $R^1$ is a branched alkyl corresponding to the branched alkyl or alkenyl chain contained in branched acid used to produce the amidoamine surfactant; $R^2$, $R^3$, $R^5$, and $R^6$ are each independently selected from H or a C1 to C4 alkyl; $R^7$ and $R^8$ are each independently selected from H, C1 to C4 alkyl for each carbon, C1 to C4 alkoxyalkyl, C1 to C4 hydroxyalkyl and

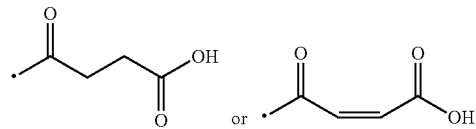

so long as the branched amidoamine surfactant has at least one group selected from

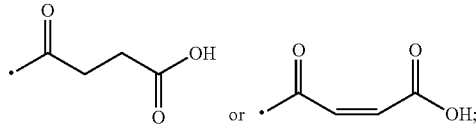

n and m are an integer from 1 to 10; and y is an integer from 0 to 5, and further wherein, when the branched amidoamine surfactant is selected from chemical formulae (IX) or (X), y is an integer from 1 to 5.

* * * * *